US012023947B2

(12) United States Patent
Alvarez et al.

(10) Patent No.: US 12,023,947 B2
(45) Date of Patent: Jul. 2, 2024

(54) LOW DIFFUSIVITY PAPER FOR SUBLIMATION PRINTING

(71) Applicant: Mativ Holdings, Inc., Alpharetta, GA (US)

(72) Inventors: Hugues Alvarez, Paris (FR); Gilbert Descouens, Saint-Girons (FR); Augustin Salasca, Saint-Girons (FR); Laurent Vives, Saint-Girons (FR); Christophe Combe, Saint-Girons (FR)

(73) Assignee: SWM Holdings US, LLC, Alpharetta, GA (US)

( * ) Notice: Subject to any disclaimer, the term of this patent is extended or adjusted under 35 U.S.C. 154(b) by 155 days.

(21) Appl. No.: 17/869,264

(22) Filed: Jul. 20, 2022

(65) Prior Publication Data

US 2023/0023300 A1 Jan. 26, 2023

Related U.S. Application Data

(60) Provisional application No. 63/224,168, filed on Jul. 21, 2021.

(51) Int. Cl.

| | |
|---|---|
| ***D06P 5/00*** | (2006.01) |
| ***B41M 5/382*** | (2006.01) |
| ***D06P 5/28*** | (2006.01) |

(52) U.S. Cl.

CPC ............. *B41M 5/382* (2013.01); *D06P 5/004* (2013.01)

(58) Field of Classification Search

None

See application file for complete search history.

(56) References Cited

U.S. PATENT DOCUMENTS

| | | | | |
|---|---|---|---|---|
| 2008/0229962 A1* | 9/2008 | Shedd | B41M 5/0256 | 428/211.1 |
| 2016/0002848 A1* | 1/2016 | Roberts | D06P 5/004 | 8/471 |

FOREIGN PATENT DOCUMENTS

| | | | | |
|---|---|---|---|---|
| CN | 103797185 A | * | 5/2016 | D21H 19/58 |
| CN | 107690389 A | * | 2/2018 | B41M 5/0256 |
| JP | 2018062124 A | * | 4/2018 | B44C 1/17 |

* cited by examiner

*Primary Examiner* — Eisa B Elhilo

(74) *Attorney, Agent, or Firm* — Dority & Manning, P.A.

(57) ABSTRACT

A protective barrier well suited for use in sublimation printing is made primarily from cellulose fibers. The protective barrier, which can comprise an uncoated paper, can be used to prevent sublimation inks from bleeding through a fabric onto the printing equipment. The uncoated paper is recyclable and can enter the paper recycle stream. The uncoated paper can contain first cellulose fibers combined and blended with second cellulose fibers that differ in fiber length and/or in the degree of refining. The uncoated paper is constructed to have a relatively low diffusivity.

19 Claims, 1 Drawing Sheet

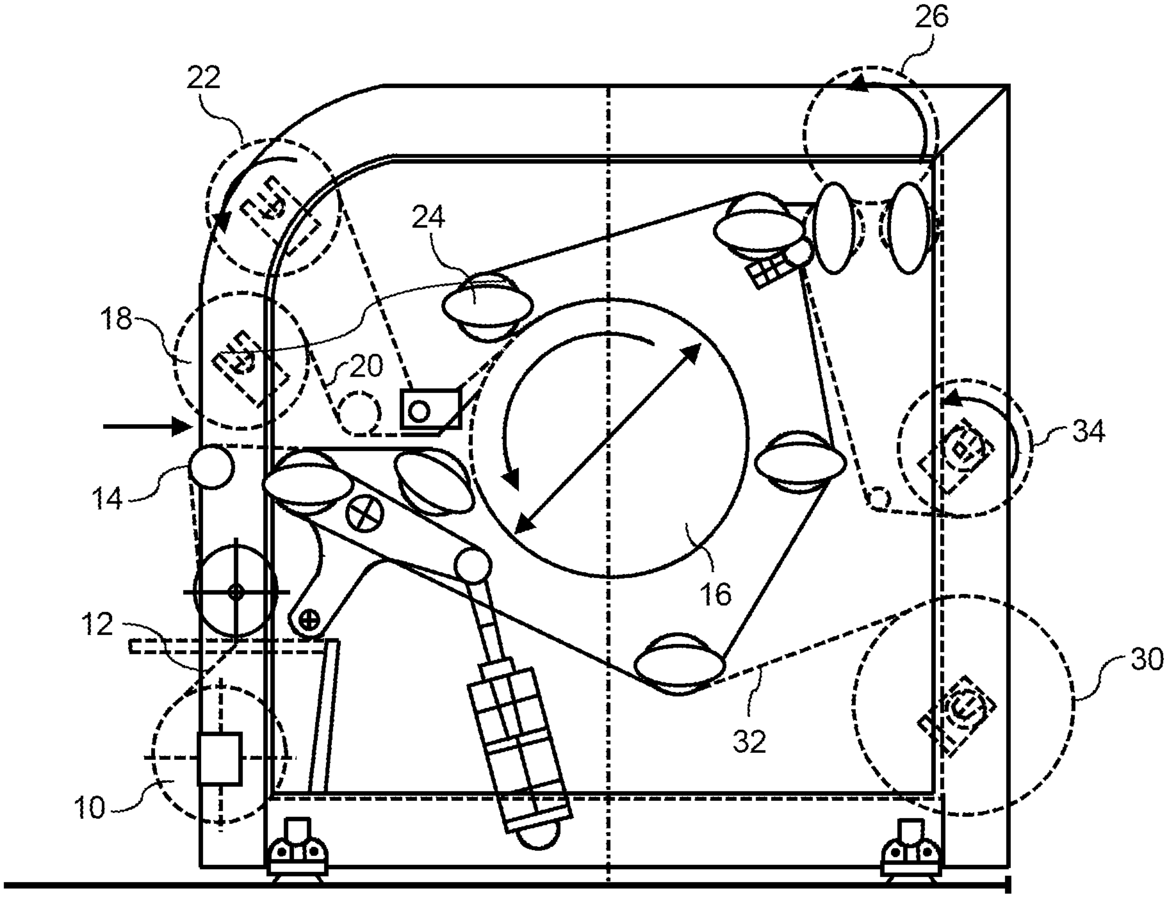
26
22
24
18
20
34
14
16
12
30
32
10

LOW DIFFUSIVITY PAPER FOR SUBLIMATION PRINTING

RELATED APPLICATIONS

The present application is based upon and claims priority to U.S. Provisional Patent Application Ser. No. 63/224,168, having a filing date of Jul. 21, 2021, which is incorporated herein by reference in its entirety.

BACKGROUND

Sublimation transfer is a process in which heat sensitive inks or dyes are transferred to a substrate, such as a fabric, in order to produce an image on the fabric. Sublimation inks turn from a solid to a gas when heated under pressure. During the sublimation process, the gaseous ink embeds itself or impregnates the fabric substrate. As the ink cools, the ink turns back to a solid and becomes a permanent part of the fabric.

The sublimation process and sublimation printing offer various advantages over other heat transfer processes. For example, images produced on substrates using the sublimation process do not form layers or coatings on top of the substrate but, instead, are integrated into the substrate, such as the fabric. In this regard, the feel of the fabric does not change after the image has been transferred. In addition, the images are resistant to fading or cracking, even after multiple laundry cycles. Further, the transferred images are very durable. All different types of images can be transferred using the sublimation process including images with intricate detail, such as photographs.

Sublimation transfer processes, for instance, are used in all different types of applications in order to transfer images. In many applications, an image is transferred to a substrate containing polyester fibers, such as a polyester fabric or a fabric made from a polyester blend. The applications include the production of sportswear, t-shirts, table covers, upholstery fabric, banners, display fabrics, tent fabrics, flags, and the like.

As described above, during the sublimation process, the ink turns into a gas and enters the fabric substrate. In many applications, the sublimation ink can pass through the substrate and transfer onto the sublimation equipment, such as a press component or a calender roll. If the ink transfers to a press component or calender roll, the ink is prone to stain other textile substrates that are later processed. In fact, once transferred to the equipment, the inks can sublimate again and again causing defects in fabric substrates that are later processed.

In order to prevent bleed-through of the sublimation inks, a protection paper is typically placed on the opposite side of the fabric substrate from the sublimation ink and between the fabric substrate and the processing equipment. The protection paper is used once and then discarded. In the past, the protection layer was made from a coated paper that was not suited for entering the paper recycling stream. Thus, the protection layer ended up in landfills in great quantities. For instance, over a thousand million tons of the protection layer are needed each year to run sublimation processes worldwide.

In view of the above, a need currently exists for a protection layer that is capable of entering the recycle stream, particularly the paper recycle stream. More particularly, a need currently exists for a protection layer made primarily from renewable resources that is not only capable of being recycled but also capable of preventing bleed through of any sublimation inks.

SUMMARY

In general, the present disclosure is directed to a protective barrier that may be used in various different applications. For example, in one embodiment, the protective barrier can be used as a protective layer in a sublimation process in which sublimation inks are applied to a fabric substrate. The protective barrier of the present disclosure can be made almost exclusively from cellulose fibers, thus making the product completely recyclable and suitable for entry into the paper recycling stream. Consequently, once used in a sublimation printing process, the protective barrier can be recycled instead of ending up in a landfill.

In general, the protective barrier of the present disclosure is comprised primarily of cellulose fibers at a relatively light basis weight that is constructed in a manner that produces a relatively low diffusivity. The above combination of properties makes the product not only well suited as an ink transferring layer or a protection layer during sublimation printing but also may be used in other applications.

In one embodiment, for instance, the present disclosure is directed to a protective barrier suited for use in sublimation printing processes. The protective barrier comprises an uncoated paper. The uncoated paper comprises a first cellulose fiber combined and blended with a second cellulose fiber. The first cellulose fiber and the second cellulose fiber are different in at least one property. For instance, the first cellulose fiber can be different from the second cellulose fiber in average fiber length, in the degree of refining (Schopper Riegler), or in both of the above characteristics. In accordance with the present disclosure, the uncoated paper can have a diffusivity of less than about 0.025 cm/sec. For example, the diffusivity of the uncoated paper can be less than about 0.020 cm/sec, such as less than about 0.015 cm/sec, such as less than about 0.010 cm/sec, such as less than about 0.008 cm/sec, and generally greater than about 0.001 cm/sec. Diffusivity is measured with a diffusivimeter, such as available from Sodim, Model D95, serial number 41.

The uncoated paper can be made primarily from cellulose fibers. For instance, the cellulose fiber content of the uncoated paper can be greater than about 95% by weight, such as greater than about 98% by weight, such as greater than about 99% by weight. In one aspect, the protective barrier can be a single layer product comprised of the uncoated paper. The uncoated paper can have a basis weight of from about 14 gsm to about 29 gsm, such as from about 14 gsm to about 26 gsm. In addition to being uncoated, the paper can be uncalendered and can be free of any sizing agents. In one aspect, the uncoated paper does not contain any filler particles or contains filler particles in relatively minor amounts, such as in amounts less than about 2% by weight.

As described above, the uncoated paper contains first cellulose fibers and second cellulose fibers. In one aspect, the first cellulose fibers comprise softwood fibers and the second cellulose fibers comprise softwood fibers. In one aspect, the first cellulose fibers have a longer average fiber length than the second cellulose fibers. The first cellulose fibers can be refined to a smaller degree than the second cellulose fibers. In still another embodiment, the first cellulose fibers not only have a longer average fiber length but are refined less than the second cellulose fibers.

In one aspect, the first cellulose fibers have a degree of refining of from 20° SR to 50° SR (Schopper Riegler). The second cellulose fibers, on the other hand, can have a degree of refining of from 60° SR to 90° SR.

In one aspect, the first cellulose fibers have an average fiber length of from about 1.9 mm to about 2.3 mm. Average fiber length can be determined using the Fiber Tester from Lorentzen & Wettre, Model 912 Plus, Serial Number L912-5023. The second cellulose fibers, on the other hand, can have an average fiber length of from about 1.7 mm to about 2.1 mm.

The uncoated paper can generally contain the first cellulose fibers in an amount from about 30% by weight to about 70% by weight, and can contain the second cellulose fibers in an amount from about 70% by weight to about 30% by weight.

In addition to having a relatively low diffusivity, the uncoated paper of the present disclosure can also have a relatively low permeability. For example, the uncoated paper can have a permeability of from about 2 Coresta to about 7 Coresta. Permeability can be determined using Permeameter Sodim D23, Model P3, Serial number 124.

When used in sublimation printing processes, the uncoated paper can serve as a protective barrier that prevents inks from transferring to the equipment. Alternatively, the paper can include a design or pattern formed from one or more sublimation inks that is then transferred to a substrate during the printing process.

The present disclosure is also directed to a kit for sublimation printing. The kit includes a transfer sheet that includes a transferable image on one surface. The transferable image is comprised of one or more sublimation inks. The kit further comprises a protective paper. The protective paper and/or the transfer sheet can be comprised of the protective barrier described above.

The present disclosure is also directed to a process for transferring an image to a fabric substrate. The process includes placing a transfer sheet adjacent to a first side of a fabric substrate. The transfer sheet includes an image made from one or more sublimation inks that is placed adjacent to the first surface of the fabric substrate. A protective paper is placed adjacent to a second surface of the fabric substrate. The protective paper and/or the transfer sheet is comprised of the protective barrier as described above. The transfer sheet is subjected to heat and pressure while in contact with the fabric substrate sufficient to cause the image to transfer to the fabric substrate.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which:

FIG. 1 is a cross-sectional view of one embodiment of a sublimation printing device that may incorporate the protective barrier of the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only and is not intended as limiting the broader aspects of the present disclosure.

In general, the present disclosure is directed to a protective barrier that is comprised of a recyclable paper product. The protective barrier, for instance, can be made almost exclusively from cellulose fibers and therefore can enter the paper recycle stream. In accordance with the present disclosure, the recyclable paper is formulated and constructed so as to have a relatively low gas diffusivity. The low gas diffusivity makes the product particularly well suited for use in many different applications. For example, in one embodiment, the protective barrier of the present disclosure can be used as a transfer paper or as a protective paper during a sublimation printing process.

During sublimation printing, an image made from one or more sublimation inks is transferred to a substrate from a transfer paper. The substrate, for instance, can be a fabric substrate. During sublimation printing, the sublimation ink is subjected to pressure and temperatures which cause the inks to transition from a solid state to a gas phase without passing through an intermediate liquid phase. Once in the gas phase, the ink becomes integrated into the fabric substrate producing images in vivid detail and color without forming a coating on the fabric substrate and therefore not changing the feel of the fabric substrate.

The sublimation transfer paper generally includes an image on one side of the paper substrate that is comprised of one or more sublimation inks. The image to be transferred to the fabric substrate is typically reverse printed onto the sublimation transfer paper using a conventional printing technique, such as inkjet printing. The transfer paper is then fed into a sublimation printing device that is designed to apply heat and pressure that causes the image to transfer to a desired substrate, such as a fabric substrate. The fabric substrate, for instance, can be a fabric containing primarily polyester fibers. The desired level of transfer of sublimable ink can be achieved by selecting the desired time, temperature and pressure during the process. For instance, sublimation printing temperatures can be generally in the range of from about 165° C. to about 215° C. During the sublimation printing process, a protective layer is typically placed adjacent to an opposite side of the fabric substrate where the image is to be received in order to prevent the inks from diffusing through the fabric and being accidentally applied to the printing equipment, such as a felt roller that is typically used to apply pressure to the substrate.

The protective barrier of the present disclosure can be used to construct the transfer paper or the protective layer. The paper layer of the present disclosure can prevent the inks from transferring to the printing equipment. The paper is also well suited to receiving an image made from sublimation inks and transferring the image to an adjacent fabric substrate.

Referring to FIG. 1, for exemplary purposes only, one embodiment of a sublimation printing device is illustrated. The sublimation printing device illustrated in FIG. 1 is for applying an image or design to a roll of material, such as a roll of a fabric substrate. The image applied to the fabric substrate can repeat for producing individual products that can be cut from the finished printed roll of material. Other sublimation printing devices, however, may operate on a sheet-by-sheet basis. For example, other sublimation printing devices may operate by feeding individual sheets of fabric substrate into the system for applying an image.

Referring to the embodiment in FIG. 1, the sublimation printing device includes a fabric unwind 10 for receiving a roll of fabric material and feeding the material into the printing system. As shown, a fabric substrate 12 is unwound from the fabric unwind 10 and fed around a guide roll 14.

From the guide roll 14, the fabric substrate 12 is placed into contact with a heated calender roll 16 for applying an image to the fabric substrate 12.

The sublimation printing system further includes a transfer sheet unwind 18 for unwinding a transfer sheet 20 into the process. The transfer sheet 20 is also placed in contact with the heated calender roll 16. More particularly, the transfer sheet 20 is placed between the surface of the calender roll 16 and the fabric substrate 12.

The transfer sheet 20 includes a transferable image on one side of the sheet that is placed in direct contact with the fabric substrate 12 during the process. The image on the transfer sheet 20 can be comprised of one or more sublimation inks. When unwound, superimposed with the fabric substrate 12 and placed in contact with the heated calender roll 16 under pressure, the one or more sublimation inks on the transfer sheet 20 turn from a solid into a gas and transfer to the fabric substrate 12 where a mirror image is formed on the fabric substrate. The transfer sheet 20 is constructed in order to facilitate transfer of the image and also serves as a protective barrier so that the inks do not bleed through the transfer sheet and onto the printing equipment during the printing process.

As shown in FIG. 1, the calender roll 16 forms a nip with a roll 24 that can be a felt roll. From the roll 24, the fabric substrate 12, printed with the image, is then rewound into a roll 26. After the roller 24, the transfer sheet 20 is also rewound on a roll 22.

In order to prevent sublimation inks from transferring onto the components of the printer, the sublimation printing system further includes a protective sheet unwind 30 for unwinding a protective layer or sheet 32. As shown in FIG. 1, the protective sheet 32 is superimposed onto the fabric substrate 12 on a surface of the fabric substrate opposite the transfer sheet 20. In this manner, the protective sheet 32 prevents sublimation inks from passing through the fabric substrate 12 and onto the equipment, especially the felt roller 24. By preventing sublimation inks from transferring to the printing components, the protective sheet 32 prevents defects from occurring in downstream processes. As shown in FIG. 1, the used protective sheet 32 is then wound on a roll 34 after the printing process and discarded.

In the past, transfer paper and/or protective sheets used in sublimation printing processes typically were made from materials that were not capable of being recycled. Thus, the discarded protective barriers ended up in landfills or were incinerated. The protective barrier of the present disclosure, however, is primarily made from cellulosic fibers and thus is capable of being recycled, while still functioning very efficiently as a protective sheet and/or as a transfer paper during sublimation printing. The protective barrier of the present disclosure, for instance, is formulated and constructed so as to have gas diffusivity properties that make the sheet particularly well suited for use in processes as disclosed in FIG. 1.

In one aspect, the protective barrier of the present disclosure is formed from a combination of at least two different cellulose fibers in a manner that produces a paper with a very low diffusivity. Of particular advantage, the cellulose fiber web of the present disclosure can have a very low diffusivity without having to apply a coating, such as a polymer coating, to the surface of the paper, without having to treat the paper with a sizing agent, and/or apply to the paper any other polymer materials that can interfere with the ability of the product to enter the recycle stream. The uncoated paper, for instance, can have a diffusivity of less than about 0.025 cm/sec. For example, the uncoated paper can have a diffusivity of less than about 0.020 cm/sec, such as less than about 0.015 cm/sec, such as less than about 0.013 cm/sec, such as less than about 0.010 cm/sec, such as less than about 0.008 cm/sec. The diffusivity is generally greater than about 0.001 cm/sec. The diffusivity can be measured at room temperature (23° C.) and can be measured using a Sodim CO2 diffusivity tester. It was discovered that the diffusivity characteristics of the paper are a result effective parameter for blocking the flow of sublimation inks in a gaseous state.

Also of advantage is that different fiber types can be blended to produce a low diffusivity while still producing a fibrous web and paper product that have a relatively low basis weight. For instance, the basis weight of the uncoated paper can be less than about 60 gsm, such as less than about 45 gsm, such as less than about 30 gsm, such as less than about 28 gsm, such as less than about 26 gsm, such as less than about 24 gsm, such as less than about 22 gsm, and generally greater than about 14 gsm, such as greater than about 16 gsm, such as greater than about 18 gsm. The low diffusivity paper can be constructed at the above basis weights without having to calender the paper and without having to add filler particles to the paper. For example, the uncoated paper or protective barrier of the present disclosure can be constructed so as to be substantially free of filler particles. The uncoated paper, for instance, can contain filler particles in an amount less than about 2% by weight, such as in an amount less than about 1.5% by weight, such as in an amount less than about 1% by weight, such as in an amount less than about 0.8% by weight. In one embodiment, the uncoated paper is filler particle free.

As described above, the uncoated paper can be formed by combining two different cellulose fiber types together. In one embodiment, the uncoated paper is a wet laid pulp fiber web. For example, the uncoated paper can be formed from an aqueous suspension of a cellulose fiber blend.

In one aspect, the uncoated paper is formed from a first cellulose fiber that is combined and blended with a second cellulose fiber. The first cellulose fiber is different from the second cellulose fiber by at least one property. In one aspect, for instance, the first cellulose fibers can have an average fiber length that is greater than the second cellulose fibers. Alternatively or in addition, the first cellulose fibers can be subjected to a lower degree of refining than the second cellulose fibers.

The cellulose fibers can generally have a fiber length of from about 0.8 mm to about 4.5 mm. In one embodiment, the first cellulose fibers can have an average fiber length of from about 1.9 mm to about 2.3 mm. The second cellulose fibers, on the other hand, can have an average fiber length of from about 1.7 mm to about 2.1 mm. A fiber Tester from Lorentzen & Wettre, Model 912 Plus, Serial Number L912-5023 measures fiber length by image analyses. The equipment is able to orientate fibers in two dimensions in order to make measurements.

Alternatively to fiber length or in addition to fiber length, the first cellulose fibers can also be refined a smaller degree than the second cellulose fibers. The amount the cellulose fibers have been refined is referred to as the freeness value. The freeness value (° SR) measures generally the rate at which a dilute suspension of refined fibers may be drained. The freeness is measured by the Schopper Riegler Method for drainability. As used herein, freeness is measured according to Test NORM EN ISO 5267-1. In general, the cellulose fibers can have a degree of refining of from about 10° SR to 95° SR. The first cellulose fibers, for example, can have a degree of refining of greater than about 20° SR, such as greater than about 25° SR, such as greater than about 30°

SR, such as greater than about 35° SR, such as greater than about 40° SR, and less than about 60° SR, such as less than about 55° SR, such as less than about 45° SR, such as less than about 40° SR, such as less than about 35° SR. The second cellulose fibers, on the other hand, can have a degree of refining of greater than about 40° SR, such as greater than about 45° SR, such as greater than about 50° SR, such as greater than about 55° SR, such as greater than about 60° SR, such as greater than about 65° SR, such as greater than about 70° SR, such as greater than about 75° SR, and less than about 90° SR, such as less than about 85° SR, such as less than about 80° SR, such as less than about 75° SR, such as less than about 70° SR.

The first cellulose fibers and the second cellulose fibers can be made from all different types of natural fibers. Cellulose fibers that may be used as the first cellulose fibers and/or the second cellulose fibers include softwood fibers, thermomechanical pulp, bast fibers, other crop fibers, and the like. Bast fibers that may be incorporated into the uncoated paper include flax fibers, hemp fibers, abaca fibers, bamboo fibers, coconut fibers, ramie fibers, jute fibers, and the like.

In one embodiment, the first cellulose fibers and the second cellulose fibers can both comprise softwood fibers in which the first cellulose fibers are refined to a greater degree and/or have a greater average fiber length than the second cellulose fibers. In one aspect, for instance, the coated paper may only contain softwood fibers.

The relative amounts of the first cellulose fibers and the second cellulose fibers can vary depending upon various factors and the properties of the fibers. The first cellulose fibers, for instance, can be present in the uncoated paper in an amount greater than about 30% by weight, such as in an amount greater than about 40% by weight, such as in an amount greater than about 45% by weight, such as in an amount greater than about 50% by weight, such as in an amount greater than about 55% by weight, such as in an amount greater than about 60% by weight and generally in an amount less than about 70% by weight, such as in an amount less than about 60% by weight. Similarly, the second cellulose fibers can be present in the uncoated paper in an amount greater than about 30% by weight, such as in an amount greater than about 40% by weight, such as in an amount greater than about 45% by weight, such as in an amount greater than about 50% by weight, such as in an amount greater than about 55% by weight, such as in an amount greater than about 60% by weight and generally in an amount less than about 70% by weight, such as in an amount less than about 60% by weight, such as in an amount less than about 55% by weight, such as in an amount less than about 50% by weight, such as in an amount less than about 45% by weight, such as in an amount less than about 40% by weight.

As described above, the uncoated paper can be made primarily from cellulose fibers and, in one embodiment, exclusively from cellulose fibers. For instance, the uncoated paper web can contain cellulose fibers in an amount greater than about 90% by weight, such as in an amount greater than about 95% by weight, such as in an amount greater than about 97% by weight, such as in an amount greater than about 98% by weight, such as in an amount greater than about 99% by weight.

In addition to having a low gas diffusivity, the uncoated paper of the present disclosure can also have a relatively low porosity or permeability. The permeability of the paper can be less than about 12 Coresta, such as less than about 10 Coresta, such as less than about 7 Coresta, such as less than about 5 Coresta, such as less than about 4 Coresta. The permeability is generally greater than about 2 Coresta, such as greater than about 3 Coresta.

The uncoated paper of the present disclosure can be devoid of almost all surface treatments, including coatings and sizing agents. In one aspect, a binder can optionally be incorporated into the fibrous web. A binder can help increase integrity, increase runnability, and increase strength. The binder, for instance, can comprise any suitable polymer, such as a film-forming thermoplastic polymer. In one aspect, the binder is a natural polymer obtained directly or derived from natural ingredients, such as plants. The binder, for instance, can be a cellulose derivative, guar gum, pectin, starch, a starch derivative, mixtures thereof, or the like. Cellulose derivatives that can be incorporated into the uncoated paper include carboxymethyl cellulose, ethyl cellulose, and the like. The binders can be combined with the cellulose fibers while in an aqueous suspension or applied to the newly formed paper at the wet end of the process. For example, the binder can be incorporated into the fiber furnish prior to being deposited onto a forming surface or applied prior to drying. If present, one or more binders can be incorporated into the uncoated paper in an amount less than about 2% by weight, such as in an amount less than about 1.5% by weight, such as in an amount less than about 1% by weight, such as in an amount less than about 0.5% by weight. One or more binders can be present in the uncoated paper generally in an amount greater than about 0.05% by weight, such as in an amount greater than about 0.1% by weight.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A protective barrier suited for use in sublimation printing processes comprising:

an uncoated paper comprising a first cellulose fiber combined and blended with a second cellulose fiber, the first cellulose fiber being different than the second cellulose fiber in average fiber length, in an amount of fiber refining, or in both average fiber length and amount of fiber refining, the uncoated paper having a cellulosic fiber content of greater than about 90% by weight, the uncoated paper having a diffusivity of less than about 0.025 cm/sec.

2. A protective barrier as defined in claim 1, wherein the uncoated paper has a cellulose fiber content of greater than about 95% by weight.

3. A protective barrier as defined in claim 1, wherein the protective barrier comprises a single layer of the uncoated paper.

4. A protective barrier as defined in claim 1, wherein the uncoated paper has a diffusivity of less than about 0.015 cm/sec and greater than about 0.001 cm/sec.

5. A protective barrier as defined in claim 1, wherein the uncoated paper contains filler particles in an amount less than about 2% by weight.

6. A protective barrier as defined in claim 1, wherein the uncoated paper has a basis weight of from about 14 gsm to about 29 gsm.

7. A protective barrier as defined in claim 1, wherein the uncoated paper has not been calendered.

8. A protective barrier as defined in claim 1, wherein the first cellulose fibers comprise softwood fibers and the second cellulose fibers comprise softwood fibers.

9. A protective barrier as defined in claim 1, wherein the first cellulose fibers have an average fiber length that is longer than the second cellulose fibers.

10. A protective barrier as defined in claim 1, wherein the first cellulose fibers are less refined than the second cellulose fibers.

11. A protective barrier as defined in claim 1, wherein the first cellulose fibers have a longer average fiber length than the second cellulose fibers and wherein the first cellulose fibers are less refined than the second cellulose fibers.

12. A protective barrier as defined in claim 1, wherein the first cellulose fibers have a degree of refining between 20° SR to 50° SR.

13. A protective barrier as defined in claim 1, wherein the uncoated paper contains a binder.

14. A protective barrier as defined in claim 13, wherein the binder comprises a starch, a starch derivative, a cellulose derivative, or mixtures thereof.

15. A protective barrier as defined in claim 1, wherein the first cellulose fibers are contained in the uncoated paper in an amount from about 30% to about 70% by weight and the second cellulose fibers are present in the uncoated paper in an amount from about 70% to about 30% by weight.

16. A protective barrier as defined in claim 1, wherein the uncoated paper has a permeability of from about 2 Coresta to about 7 Coresta.

17. A protective barrier as defined in claim 1, wherein the uncoated paper includes a first side and a second side, the protective barrier further comprising a transferable image applied to the first side of the uncoated paper comprising at least one sublimation dye.

18. A kit for sublimation printing comprising:

a transfer sheet including a transferable image on one surface of the transfer sheet, the transferable image comprising a sublimation dye; and a protective paper comprising the protective barrier as defined in claim 1.

19. A process for transferring an image to a fabric substrate having a first surface and a second and opposite surface comprising:

placing a transfer sheet adjacent to the first surface of the fabric substrate, the transfer sheet including a transferable image that is made from a sublimation dye;

placing a protective paper adjacent to the second surface of the fabric substrate, the protective paper comprising a protective barrier as defined in claim 1; and placing the transfer sheet, the fabric substrate, and the protective paper into a heated press and subjecting the transfer sheet to heat and pressure sufficient to transfer the image to the first surface of the fabric substrate.

* * * * *